Aug. 14, 1962    S. A. JOHNSON    3,048,949
AUTOMATIC INDEXING BASE FOR CHUCKS AND THE LIKE
Filed Oct. 14, 1959    2 Sheets-Sheet 1

INVENTOR.
STANLEY A. JOHNSON
BY
Merchant & Merchant
ATTORNEYS

Aug. 14, 1962 S. A. JOHNSON 3,048,949
AUTOMATIC INDEXING BASE FOR CHUCKS AND THE LIKE
Filed Oct. 14, 1959 2 Sheets-Sheet 2
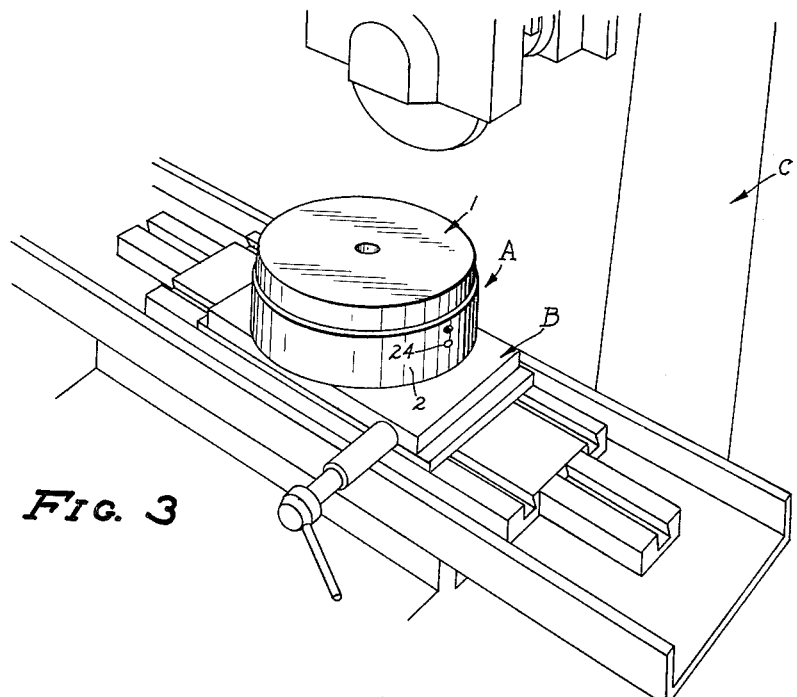
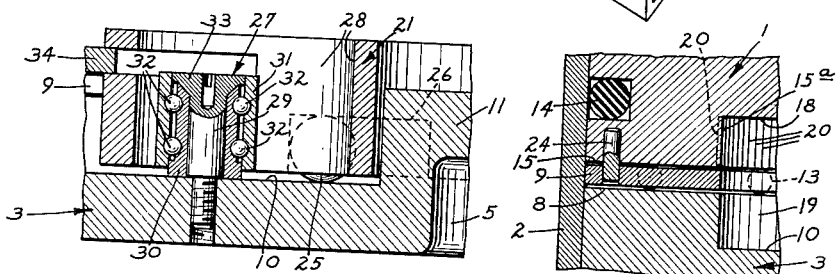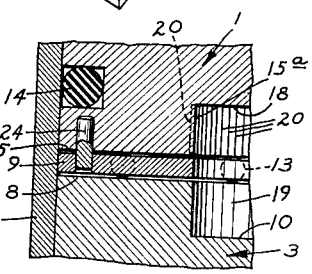
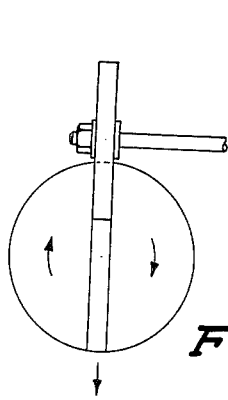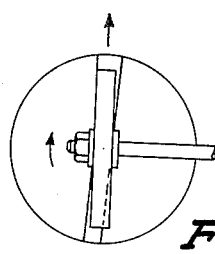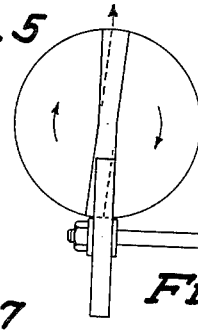
INVENTOR.
STANLEY A. JOHNSON
BY
Merchant & Merchant
ATTORNEYS

United States Patent Office 3,048,949
Patented Aug. 14, 1962

3,048,949
AUTOMATIC INDEXING BASE FOR CHUCKS
AND THE LIKE
Stanley A. Johnson, 5540 15th Ave. S.,
Minneapolis, Minn.
Filed Oct. 14, 1959, Ser. No. 846,307
5 Claims. (Cl. 51—216)

This invention relates broadly to an improvement in the machine tool or metal processing art; in particular it concerns a new and improved means for indexing work with respect to a rotating grinding wheel or other tool adapted to grind, polish or buff flat metal surfaces. Specifically my invention comprehends an inertia operated chuck of the type which may be magnetically or mechanically actuated surface that is removably positioned on the reciprocating bed of a surface grinder and which is adapted to rotate the work under the grinding wheel in response to the inertia forces set up during the reciprocation of the bed to which the device is attached.

Present means employed in the machine tool art for imparting indexing movements to a chuck include, inter alia, a variety of geared mechanisms and motor driven fixtures. Some of the former use hand methods to move the work under the tool and are characterized by a great deal of technical sophistication insofar as means for proportioning the travel of the work as compared to the travel of the hand crank is concerned. Motor driven fixtures or chucks are also available for rotating work under a grinding wheel to secure uniform grinding and other desired results.

However, none of these provide a simple self actuating means for rotatably indexing the work without requiring either hand operation or the complications inherent in a motor driven unit.

Accordingly, it is a primary object of this invention to provide an improved indexing means.

Another object of this invention is to provide indexing means adapted to operate without hand operation or external drive means.

A further object of this invention is to provide an automatic inertia operated indexing base for chucks and the like.

Yet another object of this invention is to provide in an automatic indexing base for chucks and the like novel means for converting reciprocal motion to rotary motion.

Another object of this invention is to provide an automatic indexing base for chucks and the like characterized by simplicity of construction and ease of manufacture.

Still another object of this invention is to provide in an automatic indexing base for chucks and the like means for adjusting the angular displacement of the base.

A further object of this invention is to provide an automatic indexing base for chucks and the like adapted for positioning on a reciprocating bed of a grinder and adapted to rotate a predetermined discreet amount each time the reciprocating bed changes direction.

Another object of this invention is to provide an automatic indexing base for chucks and the like having means for shielding the operative parts thereof from coolants, chips and the like.

A further object of this invention is to provide novel means in an automatic indexing base for confining the movements of the internal mechanism to predetermined paths.

These and other objects and advantages of the invention will become more clearly apparent from a consideration of the following detailed description and accompanying drawings wherein a preferred embodiment of the invention is shown by way of illustration only.

Referring to the drawings wherein like characters indicate like parts throughout the several views:

FIG. 3 is a perspective view showing the invention in operative position;

FIG. 4 is an enlarged fragmentary sectional view taken on line 4—4 of FIG. 1;

FIG. 5 is an enlarged fragmentary sectional view taken on the line 5—5 of FIG. 1; and FIGS. 6 to 8, inclusive are diagrammatic illustrations showing some of the results achieved by the invention.

Figure 1:
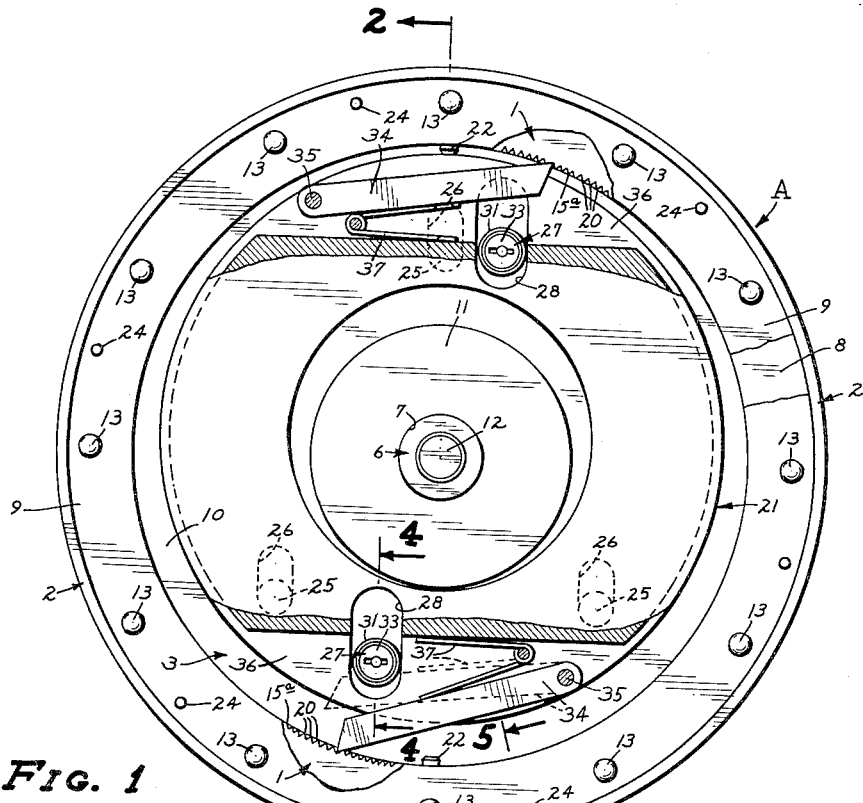
FIG. 1 is a plan view, partially in section, illustrating the invention.

Referring now to the drawings and more particularly to FIGURE 3, the invention A is secured, as by bolts or other well known means, on the reciprocating bed or table B of a surface grinder C in such a manner as to allow the work (not shown) to contact rotating wheel D of grinder C during the reciprocation of bed B. Movable components within device A cause the indexing base 1 thereof to rotate in response to the reciprocatory movements of bed B, as will be explained. Indexing base 1, as shown in the drawings, is of the magnetic chuck type although other suitable chucks such as the mechanical chuck fall within the scope of the invention. A skirt 2 encloses the lower vertical wall of the invention A to prevent coolant fluids, dust, chips and other foreign matter from entering the internal portion of the device.

Figure 2:
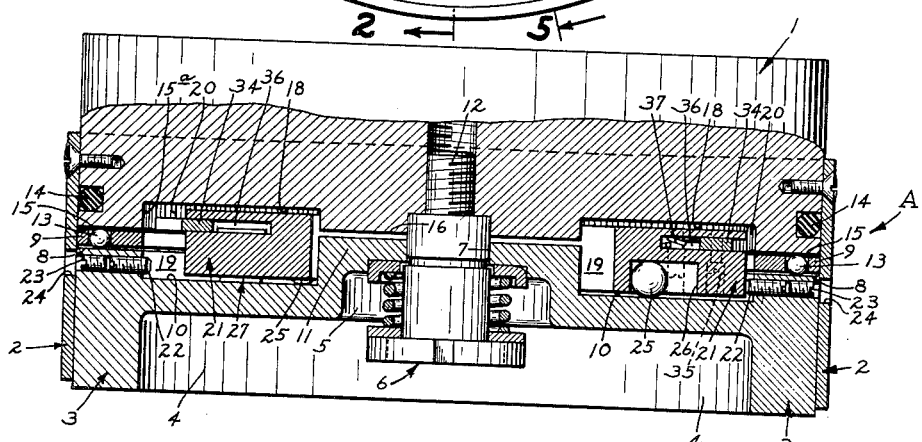
FIG. 2 is a view partially in section, taken on the line 2—2 of FIG. 1.

FIGURES 1 and 2 disclose in more detail the inner construction of device A. Supporting base 3, removably positioned on bed B of grinder C, has on its undersurface a relatively large lower circular recess 4 terminating at its inner edges in an upper recess 5 of lesser diameter. Recess 5 by virtue of its shape is adapted to receive a spring loaded threaded post assembly 6 through a central aperture 7 therein. The upper surface of base 3 includes an outer annular raised surface 8 adapted to slidably contact ball retainer ring 9 which is staked to indexing base 1 by means of pins 24 (see FIG. 5). An annular surface 10 having a lower elevation than raised surface 8 extends from the inner wall of raised surface 8 to the outer walls of a central cylindrical platform 11 of base 3. The top surface of the platform 11 is slightly higher than raised annular surface 8.

Ball retainer ring 9 is staked to indexing base 1 which is rotatably mounted on base 3. Threaded post 12 coaxial with spring assembly 6 cooperates therewith to yieldably connect indexing base 1 to supporting base 3. This construction permits the rotation of indexing base 1 about a vertical axis coincident with the axis of post 12. Ball bearings 13 are positioned circumferentially in retainer ring 9 to provide a substantially frictionless base upon which rotation may take place. Skirt 2, fastened to the outer lower wall of indexing base 1, extends down over the outer surface of supporting base 3. Leakage is prevented by virtue of flexible O-ring 14 locked in intimate relationship between base 1 and skirt 2, as shown in FIG. 2.

The internal configuration of indexing base 1 corresponds at its lower horizontal surface in a complementary manner to the upper horizontal surface of supporting base 3. That is to say, an outer lower annular surface 15 contacts upper surface of retainer ring 9 to which it is staked and a central apertured circular platform 16 of the same diameter as platform 11 of base 3 is in register therewith. Thus upper annular surface 18 of indexing base 1 is in register with the lower annular surface 10 of base 3 to provide in connection therewith an annular cavity 19 of greater depth than the similar cavities defined in part by surfaces 10 or 18 alone. An annular row of teeth 20 cut into the internal wall 15a of the lower vertical wall 15 of indexing base 1 provides in part means for the rotation of base 1, as will be explained.

Positioned between indexing base 1 and supporting base 3 within the confines of annular cavity 19 is a horizontally movable annular actuating ring 21. Ring 21 has an internal diameter of greater size than the diameter of platforms 11 and 16 and an outside diameter of lesser size than the outer diameter of cavity 19. This design provides a horizontally movable annular weight adapted to reciprocate upon surface 10 of base 3 within cavity 19. Means for limiting the end travel of ring 21 are provided by stop screws 22 positioned in diametrically opposed relationship to each other at opposite sides of base 3 and in register with the center line of the device as shown in FIGURE 1. Jam screws 23 prevent the loosening of stop screws 22 due to vibration. Access to these screws is attained by holes 24 drilled into skirt 2. As shown in FIGURES 1 and 2, actuating ring 21 moves in a path coincident with the longitudinal axis of reciprocating bed B of grinder C. As explained, the longitudinal axis of stop screws 22 are positioned in register with the longitudinal (i.e. the centerline that is positioned coincident with the longitudinal axis of bed B) centerline of bed B and the vertical centerline of the device A. Stop screws 22 prevent the inner wall of ring 21 from striking the central platform comprised of circular mating sections 11 and 16.

Ring 21 is supported on its undersurface by light weight ball bearings (preferably of nylon or similar material) 25 secured in slots 26 which are milled into ring 21. Two bearings 25 are in a side by side relationship on each side of the centerline and a third bearing 25 is longitudinally spaced therefrom on the centerline of ring 21. The three point contact provides adequate support for ring 21 and minimizes the frictional forces between ring 21 and base 3.

Transverse movement of ring 21 is restricted by a pair of vertical guides 27 positioned in a pair of slots 28 that are spaced on each side of the longitudinal centerline of the device, as shown in FIGURE 1. FIGURE 4 discloses the constructional details of vertical guides 27 including a central threaded support 29 having a fixed inner race 30 attached thereto and a rotatable vertical outer shell 31 separated therefrom by ball bearings 32. A cap 33 of suitable shape and construction holds the guide assembly together. The rotating shell 31 of guide 27 contacts the walls of slot 28 resulting in a positive guiding action characterized by a minimum of friction.

Actuating ring 21 further includes a pair of diametrically spaced elongated actuating pawls 34 hinged at their inner ends by posts 35 and adapted to move within a flat slot 36 milled in each end of ring 21. Springs 37, mounted inwardly from pawls 34 in slot 36 bias each pawl 34 into an outward tooth engaging position. In the arrangement shown in FIGURE 1 a clockwise rotation of indexing base 1 is effectuated by the movement of pawls 34 against teeth 20. The reversal of the position of the ends of pawls 34 would result in a counter clockwise movement of base 1.

If indexing base 1 is of the magnetic type, actuating ring 21 must be constructed of non-magnetic materials such as brass, bronze, aluminum and the like. Except for this limitation no special material is necessary for the fabrication of the device and to the largest extent possible, ordinary metallic shapes and materials should be employed.

In the operation of the device, supporting base 3 is secured, as by clamping or other well known means, to the reciprocating bed of a surface grinder. The device should preferably be clamped directly beneath the grinding wheel and centrally with respect to the longitudinal edges of the bed. The centerline of the device, as defined by line 2—2 of FIGURE 1, should be parallel to or coincident with the longitudinal axis of the bed so that motion imparted to the device will cause actuating ring to slide according to the direction of slots 28 with as little side thrust as possible.

Due to the reduced coefficient of friction between actuating ring 21 and supporting base 3 (by virtue of ball bearings 25) ring 21 is displaced from one end to the other with a minimum of force. A reversal of direction by the bed imparts a simultaneous linear motion to ring 21 thereby urging the free end of pawl 34 into contact with internal teeth 20 of indexing base 1. The momentum of ring 21 causes the fixed end of pawl 34 to move in a linear path while the tooth engaging end contacts teeth 20 of base 1 resulting in the rotation of base 1 in a clockwise direction. The opposite pawl 34 slides over teeth 20 of rotating indexing base 1 and serves to act as a detent during the rotational displacement of the chuck. Spring 37 serves to urge pawl 34 into place firmly against teeth 20. The same process is repeated at the end of the stroke in the opposite direction with the pawls 34 changing their respective function and rotating the base under the grinding wheel. The amount of rotational displacement for each stroke of the reciprocating bed may be adjusted by setting screws 22.

It can be seen that a short linear travel of ring 21 results in a small angular displacement of the indexing base whereas a less restricted travel of ring 21 will produce a correspondingly greater rotation of the indexing base. Thus the requirements for any particular machining operation or tool may be met by the proper selection of component parts.

FIGURES 6 to 8, inclusive, illustrate the progression of the grinding wheel upon a rotating surface. It should be noted that even wear on opposite side edge portions of the grinding wheel is obtained by the present invention by virtue of the rotational movement of the work beneath the wheel.

Although a preferred embodiment of the invention has been disclosed herein it should be understood that the invention is not to be limited thereby; the scope of the invention being construed according to the following appended claims.

What I claim is:

1. An indexing device for surface grinders and including, a base adapted to be mounted on the reciprocatory bed of a surface grinder for common reciprocatory movements therewith, a work piece holding chuck rotatably mounted on said base and having portions axially spaced therefrom, a freely shiftable weight mounted on said base about the axis of rotation of the chuck within said space for common reciprocatory movements with the base and for independent limited linear reciprocatory movement relative to said base and generally in the direction of said reciprocatory movements of said base, said weight being unconnected to any driving mechanism therefor, and driving connections between said weight and chuck for imparting limited rotary movements to the chuck, said weight being responsive to its own inertia to continue to move in one direction, when the direction of movement of said base and chuck is reversed, to impart said limited rotary movement to said chuck in one direction through said driving connections.

2. An indexing device for surface grinders and including a base adapted to be mounted on the reciprocatory bed of a surface grinder for common reciprocatory movements therewith, a workpiece holding chuck rotatably mounted on said base, an annular portion of the chuck about the axis thereof being axially spaced from the base to define therewith an annular chamber generally concentric with the axis of rotation of said chuck, a freely shiftable weight mounted on said base within said chamber about the axis of rotation of the chuck for common reciprocatory movements with said base and said chuck and for independent linear reciprocatory movements relative to said base and chuck generally in the direction of reciprocatory movements thereof, said weight being unconnected to any driving mechanism therefor, and driving connections between said weight and chuck for imparting limited rotary movement to the chuck, said weight being responsive to its own inertia to continue to move in one direction, when the direction of movement of said base and chuck is reversed, to impart said limited rotary movement to said chuck in one direction through said driving connections.

3. The structure defined in claim 2 in further combination with adjustable means limiting said independent reciprocatory movements of said weight, whereby to vary the extent of rotary movement of said work piece holding chuck.

4. An indexing device for surface grinders and including, a base adapted to be mounted on the reciprocatory bed of a surface grinder for common reciprocatory movements therewith, a workpiece holding chuck rotatably mounted on said base, and having portions axially spaced therefrom, a freely shiftable weight mounted on said base about the axis of rotation of the chuck within said space for common reciprocatory movements therewith and for independent limited linear reciprocatory movements relative to said base and generally in the direction of said reciprocatory movements of said base, said weight being unconnected to any driving mechanism therefor, and independent driving means between opposite sides of said weight and said chuck for imparting limited rotary movement to the chuck, said driving means being respectively engageable with the chuck on substantially diametrically opposite sides of the axis of rotation of the chuck, said weight being responsive to its own inertia to continue to move in one direction when the direction of movement of said base and chuck is reversed, to impart said limited rotary movement of said chuck in one direction through one of said driving means, said weight being responsive to its own inertia to continue to move in the opposite direction when movement of said base and chuck is again reversed to further impart said limited rotary movement to said chuck in the one direction of rotary movement thereof through the other of said driving means.

5. An indexing device for surface grinders and including, a base adapted to be mounted on the reciprocatory bed of a surface grinder for common reciprocatory movements therewith, a workpiece holding chuck, means journalling said chuck on said base for rotation on a vertical axis, an annular portion of the chuck about the axis thereof being axially spaced from the base to define therewith an annular chamber generally concentric with the axis of rotation of said chuck, a freely shiftable weight in said chamber encompassing the axis of rotation of the chuck and unconnected to any driving mechanism, means mounting and guiding said weight on said base for limited linear reciprocatory movements relative to said base and chuck in the direction of reciprocatory movements of the base and chuck, an annular rolling friction bearing interposed between said base and chuck and concentric with said chuck, yielding means urging said chuck and base toward operative engagement with opposite side of said annular bearing, and driving connections between said weight and chuck for imparting limited rotary movement to said chuck, said weight being responsive to its own inertia to continue to move in one direction, when the direction of movement of said base and chuck is reversed, to impart said limited rotary movement through said chuck in one direction through said driving connections.

References Cited in the file of this patent
UNITED STATES PATENTS

| | | |
|---|---|---|
| 2,351,246 | Walling | June 13, 1944 |
| 2,355,022 | Whitin | Aug. 1, 1944 |
| 2,651,895 | Rocks | Sept. 15, 1953 |
| 2,841,933 | Bart | July 8, 1958 |
| 2,850,854 | Levy | Sept. 9, 1958 |
| 2,871,732 | Olson | Feb. 3, 1959 |